(12) United States Patent
Calder

(10) Patent No.: US 12,060,093 B2
(45) Date of Patent: Aug. 13, 2024

(54) ODOMETRIC METHOD, IN PARTICULAR FOR A RAIL VEHICLE OR A CONTROL CENTER

(71) Applicant: Siemens Mobility GmbH, Munich (DE)

(72) Inventor: Steven Alexander Calder, Charlotte, NC (US)

(73) Assignee: Siemens Mobility GmbH, Munich (DE)

( * ) Notice: Subject to any disclaimer, the term of this patent is extended or adjusted under 35 U.S.C. 154(b) by 304 days.

(21) Appl. No.: 17/620,832

(22) PCT Filed: Jun. 15, 2020

(86) PCT No.: PCT/EP2020/066442
§ 371 (c)(1),
(2) Date: Dec. 20, 2021

(87) PCT Pub. No.: WO2020/254229
PCT Pub. Date: Dec. 24, 2020

(65) Prior Publication Data
US 2022/0402535 A1    Dec. 22, 2022

(30) Foreign Application Priority Data
Jun. 18, 2019  (DE) ............. 10 2019 208 865.1

(51) Int. Cl.
*B61L 25/02*    (2006.01)
*B61L 15/00*    (2006.01)
*B61L 27/40*    (2022.01)

(52) U.S. Cl.
CPC ......... *B61L 25/026* (2013.01); *B61L 15/0072* (2013.01)

(58) Field of Classification Search
CPC ............. B61L 15/0072; B61L 15/0081; B61L 25/021; B61L 25/026; B61L 27/20;
(Continued)

(56) References Cited

U.S. PATENT DOCUMENTS 5,961,571 A * 10/1999 Gorr ................. G01S 3/783
                                                340/988
6,862,502 B2    3/2005 Peltz et al.
(Continued)

FOREIGN PATENT DOCUMENTS

DE    102006059037 A1    6/2008
DE       60317345 T2     8/2008
(Continued)

OTHER PUBLICATIONS

DE102012215533_English_translation (Year: 2014).*
(Continued)

*Primary Examiner* — Erick R Solis
(74) *Attorney, Agent, or Firm* — Laurence A. Greenberg; Werner H. Stemer; Ralph E. Locher

(57) ABSTRACT

A method for odometric monitoring of a rail vehicle includes recording measured values with a sensor in the rail vehicle, and calculating location information and/or speed information from the measured values. The measured values and/or the location information and/or the speed information is stored, and patterns for the measured values and/or the location information and/or the speed information are generated by evaluating the already acquired measured values and/or the location information and/or the speed information. The currently acquired measured values and/or the location information and/or the speed information are synchronized with at least one pattern, and the occurrence of deviations from the patterns is output via an interface. A rail vehicle, a control center, a computer program product and a
(Continued)

provision apparatus for the computer program product are also provided.

13 Claims, 3 Drawing Sheets

(58) Field of Classification Search
CPC ............... B61L 27/40; B61L 2027/202; B61L 2027/204; B61L 2201/02
USPC .............................................. 701/19, 20, 27
See application file for complete search history.

(56) References Cited

U.S. PATENT DOCUMENTS

| | | | |
|---|---|---|---|
| 11,648,951 B2* | 5/2023 | Pendelton | B60W 40/08 |
| | | | 701/27 |
| 11,691,634 B1* | 7/2023 | Zhou | G07C 5/085 |
| | | | 701/93 |
| 2015/0239482 A1* | 8/2015 | Green | B61L 15/0063 |
| | | | 246/122 R |
| 2019/0161919 A1 | 5/2019 | Gilbert | |
| 2021/0016811 A1* | 1/2021 | Stupar | G06T 7/0004 |
| 2021/0094596 A1* | 4/2021 | Badarayani | B61L 27/57 |
| 2021/0114639 A1* | 4/2021 | Kinio | G01C 22/02 |
| 2021/0171078 A1* | 6/2021 | Green | B61L 25/021 |
| 2021/0173071 A1* | 6/2021 | Helwa | G01S 13/60 |
| 2022/0234634 A1* | 7/2022 | Beach | B61L 27/20 |
| 2023/0077863 A1* | 3/2023 | Pendleton | G06F 11/3692 |
| | | | 701/27 |

FOREIGN PATENT DOCUMENTS

| | | |
|---|---|---|
| DE | 102012215533 A1 | 3/2014 |
| DE | 102017215802 A1 | 3/2019 |
| WO | WO 2018133922 A1 | 7/2018 |
| WO | WO 2019086097 A1 | 5/2019 |

OTHER PUBLICATIONS

Peter Hintze et al: ""Im Plan steht aber ein anderer Kilometer!"—Das Potenzial georeferenzierter Bahninfrastrukturdaten—"But that's not the kilometre in the plan!"—the potential of georeferenced railway infrastructure data", Signal Und Draht: Signalling & Datacommunication, Bd. 110, Nr. 11, Nov. 1, 2018 (Nov. 1, 2018), Seiten 6-15, DE ISSN: 0037-4997; XP 055 522 312.

* cited by examiner

ODOMETRIC METHOD, IN PARTICULAR FOR A RAIL VEHICLE OR A CONTROL CENTER

FIELD AND BACKGROUND OF THE INVENTION

The invention relates to a method for odometric monitoring (odometry) of a rail vehicle in which
- measured values are recorded with a sensor in the rail vehicle,
- location information and/or speed information is calculated from the measured values, The invention furthermore relates to a rail vehicle and a control center, which are equipped to carry out this method.

Lastly the invention relates to a computer program product and also to a provision apparatus for said computer program product, wherein the computer program product is equipped with program instructions for carrying out this method.

Odometry in the sense of this invention is a significant functionality of automatic train control system, for example of the so-called European Train Control System (ETCS). The specifications of automatic train control systems (also called train safety systems) use odometry as a process for measuring the movement of a train along a track, which is used for speed and travel measurement. Odometry is for example part of an ETCS reference architecture. The travel, speed and acceleration must for example correspond to a high safety level, for example the safety requirement stage SIL-4, and is used for numerous functions of the automatic train control system, including the monitoring of constant maximum speeds and braking curve calculation, position reports, rolling away and stationary monitoring as well as track vacancy notification.

Measured values are thus processed in odometry in order to obtain location information and/or speed information from them. Speed information primarily involves the speed of rail vehicles in the rail network. Location information in the first instance involves the current position of the rail vehicles in the rail network. Both speed information and also location information can be synchronized at regular intervals with available information. For example the position of a train during its stop in a station is known comparatively precisely. However such synchronizations are only possible at selected intervals and at selected locations. There are thus always periods of time and also track sections in which the location information and speed information can only be calculated with odometry. In this time errors can occur of which the effect becomes even greater in the subsequent time before there can be a safe synchronization once again.

The detection of errors during sensor measurements is therefore indispensable in order to guarantee the safety of odometry and positioning systems in rail vehicles. A rail vehicle therefore supports the use of sensors such as Doppler radar and wheel pulse generators (called wheel sensors for short) in order to estimate the speed and also the distance traveled in relation to a reference. Because of the failure of the sensors the estimation can differ from the actual speed or distance.

Different conditions can lead to failure of sensors. Thus for example wheel slippage and sliding can lead to wheel pulse generators creating measurement errors in the estimation of speed. Moreover Doppler radars on board can report incorrect measurements during snowfall and or when another train is traveling in the opposite direction. Although the likelihood of such errors is slight, odometry must be able to initiate measures to ensure the high standards as a result of such failures.

SUMMARY OF THE INVENTION

The object of the invention lies in specifying a method for odometry with which an automatic train control system can be operated as consistently as possible with high reliability. Moreover it is an object of the invention to specify a rail vehicle or a control center with which the said method can be carried out with a consistently high safety standard. Lastly it is an object of the invention to specify a computer program product or a provision apparatus for such a computer program product with which the method is able to be carried out with a consistently high safety standard.

This object is achieved in accordance with the claim subject matter specified at the start (method) in accordance with the invention by
- the measured values and/or the location information and/or the speed information being stored,
- patterns for the measured values and/or the location information and/or the speed information being created by evaluation of measured values already acquired and/or the location information and/or the speed information,
- currently acquired measured values and/or the location information and/or the speed information being synchronized with at least one pattern,
- the occurrence of deviating waveforms from the pattern being output via an interface. The interface can involve an output device for the human-machine interface (for example a display) or an interface for data transmission to another system, for example a control system or a computer of the automatic train control system.

In accordance with the invention there is provision in other words for storing patterns for unremarkable measurement results (i.e. those not affected by anomalies or errors) in a database for example. The current measured measurement results can then be compared with the patterns. This makes it possible to recognize anomalies quickly and to take suitable measures as a result. These can consist of restricting train operations or making corrections to the measured values if measurement errors are involved. If measurement errors occur more frequently, faulty components of the automatic train control system can be replaced for example.

An improved recognition of odometric errors (anomalies) can contribute in accordance with the invention to lessening the safety margins. The shrinking of the safety error limits can lead to a more precise odometry and positioning method. This is achieved in accordance with the invention during periods of time in which a reliable synchronization with other data available to the automatic train control system is not possible but the position information and/or the speed information have to be derived exclusively from the measured values of the odometry method, by the inventive method being applied.

In accordance with the invention there is thus a synchronization during this period with the patterns available, in order to be able to counteract the occurrence of errors as quickly as possible. The measures that are to be initiated through the establishment of a deviation from the patterns can be made dependent on the strength of the deviation from the pattern, on the period of time in which the automatic train control system does not have any more precise data available and on the current operating states (volume of traffic, speed of the rail vehicles).

The advantage of the inventive method lies in the fact that, even in longer periods of time in which odometric measurements are carried out without any synchronization with secured data, a synchronization with the patterns is possible which ensures a high safety standard (for example SIL-4). This can thus advantageously be achieved with little outlay in components, since no additional sensors are necessary in the vehicles to be monitored or in the control center. Therefore the gain in safety mentioned is advantageously also able to be achieved cost effectively.

The inventive method-related measures are preferably implemented with computer support, this means that the automatic train control system is controlled by computers, of which the algorithms are suitable and have been programmed for carrying out the inventive method. Unless specified otherwise in the description given below the terms "create", "calculate", "compute", "establish", "generate", "configure", "modify" and the like preferably relate to actions and/or processes and/or processing steps which change data and/or create it and/or change the data into other data, wherein the data can be represented in particular as physical variables or be present as such, for example as electrical pulses. In particular the expression "computer" is to be interpreted broadly as covering all electronic devices with data processing characteristics. Computers can thus for example be personal computers, servers, handheld computer systems, pocket PC devices, mobile radio devices and other communication devices that can process data with computer support, processors and other electronic devices for data processing, which preferably can also be connected together into a network.

"Computer-assisted" in conjunction with the invention can be understood for example as an implementation of the method in which a computer or a number of computers carries out or carry out a method step of the method.

A "processor" in conjunction with the invention can be understood for example as a machine or an electronic circuit. The processor can in particular involve a central processing unit (CPU), a microprocessor or a microcontroller, for example an application-specific integrated circuit or a digital signal processor, possibly in conjunction with a memory unit for storage of program instructions, etc. A processor can for example also particularly involve an FPGA (Field Programmable Gate Array) or an ASIC (Application-Specific Integrated Circuit) or a DSP (Digital Signal Processor). A processor can also be understood as a virtualized processor or a soft CPU. This can for example also involve a programmable processor with a configuration that is equipped for carrying out the said inventive method.

A "memory unit" in conjunction with the invention can be understood for example as a computer-readable memory in the form of a random access memory (RAM) or a hard disk.

In accordance with an embodiment of the invention there is provision for evaluation to take place by machine learning. Advantageously the automatic train control system is equipped in this way with an artificial intelligence, which allows it automatically to make a comparison of the measured values and/or location information and/or speed information with patterns. Moreover, the equipping of an automatic train control system with an artificial intelligence allows the creation of patterns to take place or patterns already created to be able to be optimized or adapted to change general conditions. Such a train control system equipped with an artificial intelligence is then also referred to as self-learning, as will be explained in greater detail below.

The equipping of the train control system with an artificial intelligence has the great advantage that the system can react to changes and can undertake an autonomous optimization. This approach is always especially advantageous when there is not enough data to enable a reliable control/regulation to be undertaken, as is the case for example when the odometric method has to make do over a longer period of time without reference values.

Artificial intelligence (also abbreviated to AI below) in the narrower sense within the framework of this invention is computer-assisted machine learning (also abbreviated to ML below). This involves statistical learning of the parameterization of algorithms, preferably for very complex application cases. By means of machine learning the system recognizes, on the basis of learning data previously entered, patterns and laws in the process data required. With the aid of suitable algorithms stand-alone solutions to problems that arise can be found by ML. ML is divided into three fields—supervised learning, unsupervised learning and reinforcement learning, with the specific (sub)applications regression and classification, structure recognition and prediction, data generation (sampling) and autonomous action.

In supervised learning the system is trained by the relationship between input and associated output of known data. This depends on the availability of correct data, since if the system is trained with bad examples it learns incorrect relationships. In unsupervised learning the system is likewise trained with example data, but only with input data and without any relationship to a known output. It learns how data groups are to be formed and expanded, what is typical and where deviations are occurring. This enables application cases to be described and error states discovered. In reinforcement learning the system learns through trial and error, by suggesting solutions to given problems and receiving via a feedback function a positive or negative assessment of this suggestion. Depending on a reward mechanism the AI system learns to carry out corresponding functions.

Machine learning can be carried out for example by artificial neural networks (abbreviated to ANN below). In accordance with one embodiment of the invention there is provision for machine learning to be carried out with an artificial neural network. Advantageously artificial neural networks make an environment available that supports machine learning. In this case the process to be managed can be processed by the ANN even when little information is available, wherein the patterns available for synchronization of the odometric data (also referred to here as measured values and/or location information and/or speed information) are optimized by ongoing operation and can be adapted to different situations (different locations, different external locations such as weather events, ageing-related changes), without this situation having to be detected and described in detail.

Artificial neural networks are mostly based on the networking of many neurons, for example McCulloch-Pitts neurons, or slight variations thereof. Basically other artificial neurons can also be used in ANN, e.g. the high-order neuron. The topology of a network (e.g. the assignment of connections to nodes, must be determined as a function of its task. After the construction of a network there follows the training phase, in which the network "learns". In such cases a network can learn through the following methods for example:
Development of new connections
Deletion of existing connections
Changing the weighting (that of neuron j to neuron i)

Adaptation of the threshold values of the neurons, provided these possess threshold values Insertion or deletion of neurons Modification of activation, propagation or output function Moreover the learning method changes when the activation function of the neurons or the learning rate of the network changes. Viewed in practical terms an ANN mainly learns by modification of the weights of the neurons. An adaptation of the threshold value can also be handled here by an on-neuron. This means that ANNs are in a position to learn complicated non-linear functions using a learning algorithm, which attempts to determine from existing input values and desired output values all parameters of the function by iterative or recursive procedures. ANNs in this case are a realization of the connectionist paradigm, since the function consists of many simple similar parts. Only in its sum does the behavior become complex.

In accordance with an embodiment of the invention there is provision for the artificial neural network to be an LSTM network, wherein the network is supplied continuously or at regular intervals (quasi continuously) with the measured values and/or with the location information and/or the speed information.

LSTM stands for long short-term memory. It is proposed that LSTM networks be used in order to identify an anomaly or error in a measurement during the odometric method. These anomalies can be identified since they lie outside the range that is determined by the prediction of the LSTM network using measured values already available (of which there are ever more over time, so that the reliability of the results of the LSTM network becomes ever more reliable). In order to train LSTM networks historic odometric data from various sensors is used. The networks used can then create a prediction of the next measurement that is to be carried out. The actual measurements of the odometric sensors are then compared with the predicted odometric data of the LSTM networks. If a measurement/calculation of odometric data lies outside the predicted range, this is seen as anomalous. Further measures are then derived from this.

In accordance with an embodiment of the invention there is provision for the pattern to contain permitted ranges of values for the measured values and/or the location information and/or the speed information in each case.

Through this a simple and rapid check on the odometric data of a current dimension measurement/calculation is advantageously possible in ongoing operation, so that there can be an immediate reaction to anomalies or errors. On the other hand the current measurements are simultaneously employed to adapt the reference values established in a suitable manner where necessary.

In accordance with an embodiment of the invention there is provision, in the creation of the patterns, for the location in which the measured values arose to be linked to the pattern.

With this embodiment of the invention it can advantageously be achieved that changed odometric data can be assigned locally to specific sections of a rail network. This is especially advantageous for variations, which arise because of different local conditions in the rail network. In other words a location-dependent storage of patterns for the comparison of the odometric data is possible. This advantageously makes the prediction more precise and the patterns can be equipped with a narrower tolerance range.

In accordance with an embodiment of the invention there is provision, in the creation of the pattern, for additional information relating to a rail vehicle in which the measured values have arisen and/or relating to the measurement method used and/or to the sensor type used to be linked to the pattern.

With this embodiment of the invention it can advantageously be achieved that the patterns for odometric data can be detected as a function of different reference systems and of the sensors employed in said systems. Here too individual differences can occur, which with the availability of information as to which train is en route in the rail network, make it possible for the automatic train control system to select the suitable patterns. This also enables more individual patterns to be used, so that advantageously patterns with a narrower tolerance range can be used.

In accordance with an embodiment of the invention there is provision for this to be carried out by a computer in a rail vehicle.

This variant advantageously in particular supports the recording of train-individual patterns (as described above), which naturally can also be passed on to a control center after they have been created and can be stored centrally there. Moreover problems in the transmission of the data can advantageously be avoided if said data is already evaluated in the train (in tunnels for example). The artificial intelligence of machine learning in this variant is advantageously distributed to a number of places, namely the rail vehicles.

In accordance with an embodiment of the invention there is provision for this to be carried out with a computer in a control center for the rail traffic.

This variant advantageously supports the creation of a central database. Moreover this solution is advantageously very cost effective, since a central computer with an artificial intelligence can be equipped with a suitable capacity for the computation of a number of patterns simultaneously. A central computer of the control center can then be fully utilized in respect of its capacity at most times, for which reason the computing capacity can be optimized. A decentralized solution, in which the calculation is undertaken in the individual vehicles (trains), necessarily has a higher level of redundancy, for which reason on the other hand however the consequence is a greater availability and shorter time until the results are available.

As an alternative, the said object is achieved in accordance with the invention by the claimed subject matter (rail vehicle) specified at the outset, by said vehicle being equipped to carry out a method as claimed in claim 8 with a computer in a rail vehicle.

The advantages connected herewith have already been explained in detail in relation to the claimed odometric method and also apply in the same way to the rail vehicle. In particular the embodiments of the method presented in the dependent claims can also be implemented in the rail vehicle.

As an alternative, the said object is achieved in accordance with the invention by the claimed subject matter (control center) specified at the outset, by said control center being equipped to carry out a method as with a computer in a control center for rail traffic.

The advantages connected herewith have already been explained in detail in relation to the claimed odometric method and also apply in the same way to the control center. In particular the embodiments of the method presented in the dependent claims can also be implemented in the rail vehicle.

Furthermore a computer program product with program instructions for carrying out the said inventive method and/or its exemplary embodiments is claimed, wherein the inventive method and/or its embodiments are able to be carried out in each case by means of the computer program product.

What is more a provision apparatus for storage and/or provision of the computer program product is claimed. The provision apparatus is a data medium for example, which stores and/or provides the computer program product. As an alternative and/or in addition the provision apparatus is for example a network service, a computer system, a server system, in particular a distributed computer system, a cloud-based computer system and/or virtual computer system, which stores and/or provides the computer program product in the form of a data stream.

Further details of the invention are described below with the aid of the drawing. Elements of the drawing that are the same or correspond to one another are labeled with the same reference character in each case and are only explained more than once where there are differences between the individual figures.

The exemplary embodiments described below involve preferred forms of embodiment of the invention. In the exemplary embodiments the components described each represent individual features of the invention to be considered independently from one another, which in each case also develop the invention independently of one another and are thus to be seen as an element of the invention individually or in a combination other than that shown. Furthermore the forms of embodiment described are also able to be expanded by further features of the features of the invention already described.

DETAILED DESCRIPTION OF THE INVENTION

Figure 1:
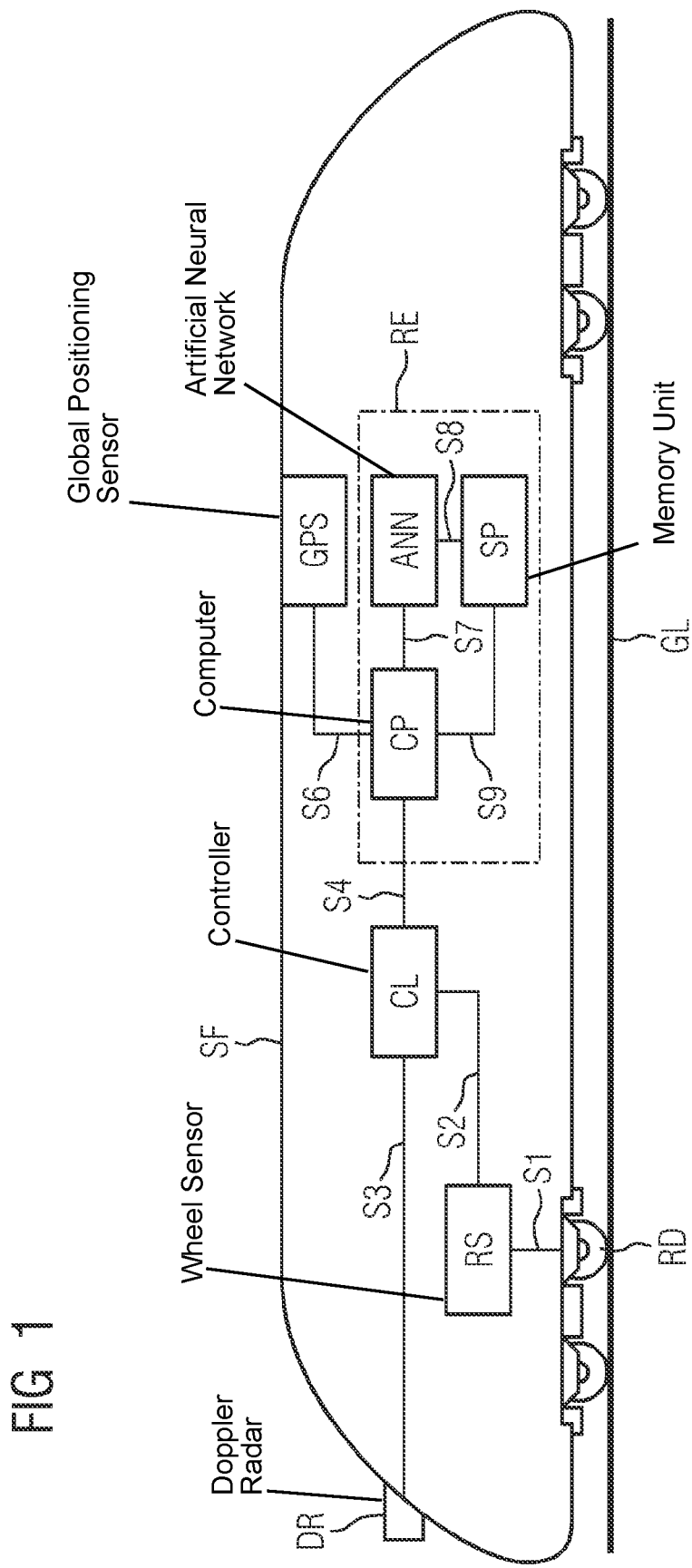
FIG. 1 shows (as a schematic) an exemplary embodiment of the inventive rail vehicle, which is configured to carry out an exemplary embodiment of the inventive odometric method.

Shown in FIG. 1 is a rail vehicle SF which is standing on a track GL. The track GL is part of a rail network SN not shown in any greater detail (cf. FIG. 2), over which the rail vehicle SF can travel. The rail vehicle in accordance with FIG. 1 is a locomotive.

Shown as a block diagram in the rail vehicle SF is a facility for carrying out an odometric method. This system has a wheel sensor RS, which counts the rotation of a wheel RD of the rail vehicle SF and in this respect can describe information about the speed and the change in location of the rail vehicle SF on the basis of measured values of a measurement result (ME1, cf. FIG. 3). Moreover the rail vehicle SF has a radar, in particular a Doppler radar DR, with which both the distance of the rail vehicle SF from objects and also, by exploiting the Doppler effect in a way known per se, the speed of the rail vehicle SF can be established. To this extent the actual speed and the actual position of the rail vehicle SF can be established in parallel with a number of sensors, in order where necessary to be able to make statements about measurement errors.

A first interface S1 is provided for recording the wheel rotation of the wheel RD by the wheel sensor RS. The wheel sensor RS is connected via a second interface S2 to a controller CL. The Doppler radar DR is connected via a third interface S3 to a controller CL. The controller CL is responsible in this respect for a first evaluation of the measurement signals and a possible synchronization of the same. The controller CL is configured to calculate location information and speed information relating to the rail vehicle SF from the measured values of the Doppler radar DR and the wheel sensor RS.

The controller CL is connected via a fourth interface S4 to a computer or processor CP. This computer receives via a sixth interface S6 a signal of a global positioning sensor GPS. The global positioning sensor can for example use the GPS standard or also another functional principle in order to determine the position of the rail vehicle SF independently of the odometric measurements. Through this a reference value can be created or at least a comparison value, which is transferred via the sixth interface S6 to the computer CP. This comparison value can then at least be employed when an error or an anomaly is determined by the application of the odometric method (see below for more details).

The computer CP furthermore has a seventh interface S7 to an artificial neural network ANN, of which the architecture is not shown in any greater detail in accordance with FIG. 1. The artificial neural network ANN is suitable for implementing machine learning to the extent that the measured values of the Doppler radar DR and of the wheel sensor RS and also the location and speed information established from the measurement data can be subjected to a plausibility check. Anomalies and (apparent) errors are discovered by said check, by the odometric data considered not lying in an expected window (measurement window, value window) defined for this in the corresponding situation. In this case the artificial neural network ANN compares the current odometric data with historical data stored in a memory unit SP, wherein an eighth interface S8 is used for this purpose. The memory unit SP is connected to the computer CP via a ninth interface S9, so that further information, such as the value established by the global positioning sensor GPS, can be transferred via said interface to the memory unit SP for the position information.

The variant in FIG. 1 shows an example in which the infrastructure for the application of the inventive odometric method in the rail vehicle SF is used. The ANN must be provided in this case in the rail vehicle SF and is primarily used for processing the data created in the rail vehicle SF. Here the computer CP, the artificial neural network ANN and the memory unit SP form a processing unit RE. This is however only to be understood as an example. In the exemplary embodiment in accordance with FIG. 1 the evaluation of the measured values is carried out by the controller CL and the processing by the artificial neural network ANN is controlled by the computer CP. The processing of the measured values from the wheel sensor RS and the Doppler radar DR can be undertaken directly by the computer CP or the controller CL could be part of the processing unit RE. What is more other configurations are also conceivable, which can be found depending on the requirements of the individual case for different rail vehicles SF.

Figure 2:
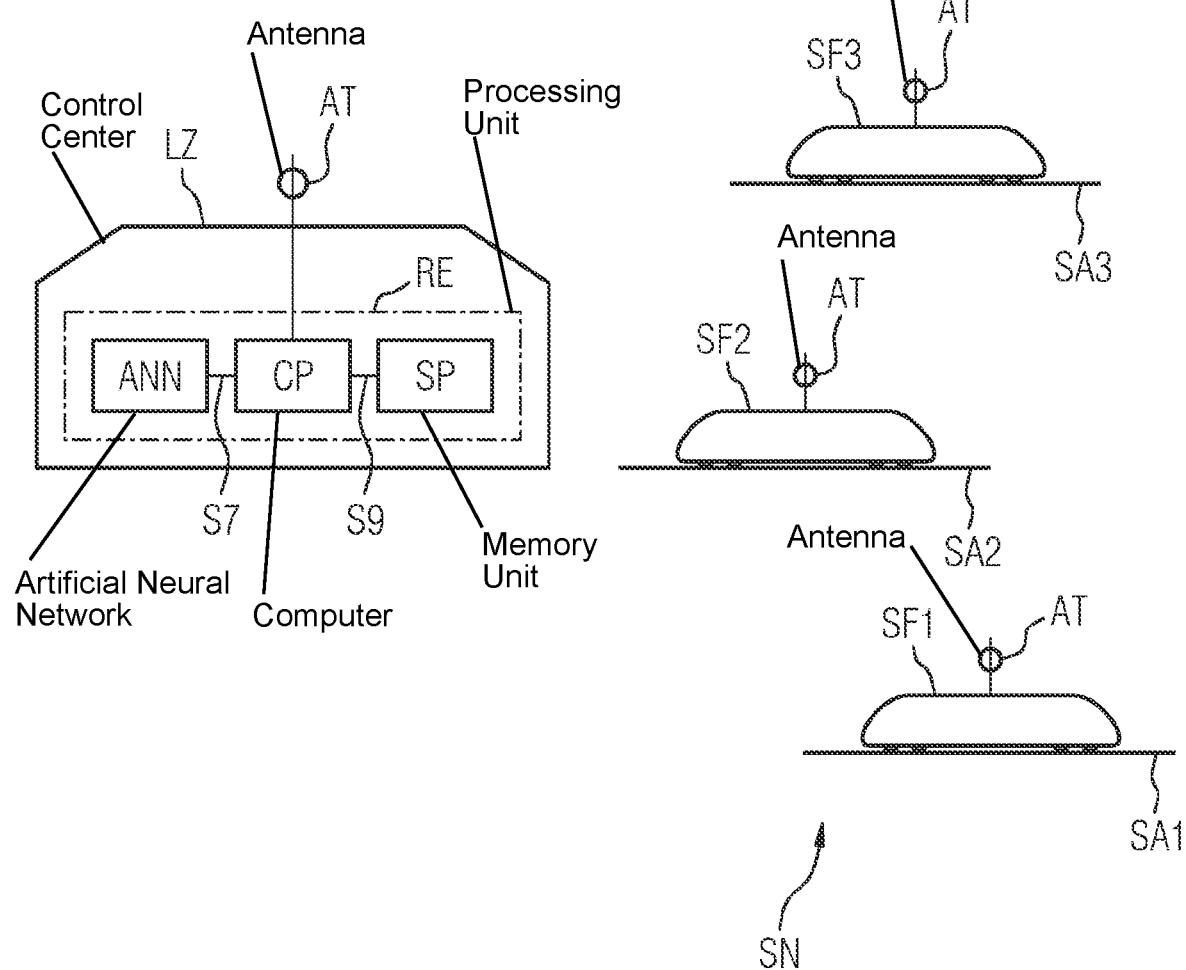
FIG. 2 shows (as a schematic) an exemplary embodiment of the inventive control center, which is designed to carry out an exemplary embodiment of the inventive odometric method.

A solution is shown in accordance with FIG. 2 in which the processing unit RE (cf. FIG. 1) is accommodated in a control center LZ, wherein the control center LZ is part of an automatic train control system, in particular ETCS.

The control center LZ is equipped with an antenna AT. Likewise a rail vehicle SF1 on a track section SA1 and a rail vehicle SF2 on a track section SA2 and a rail vehicle SF3 on a track section SA3 are equipped with antennas AT, so that these rail vehicles can communicate with the control center LZ via radio (not shown in any greater detail). Provided in the rail vehicles SF1, SF2, SF3, not shown in any greater detail, are a Doppler radar DR, a wheel sensor RS and a controller CL corresponding to the rail vehicle SF in accordance with FIG. 1. A global positioning sensor GPS, as shown in FIG. 1, can also be installed.

The rail vehicles SF1, SF2, SF3 thus forward the data to the control center LZ, where this is processed by the artificial neural network ANN in the way described in FIG. 1. Here a memory unit SP is used, wherein the processing capacity of the artificial neural network ANN in accordance with FIG. 2 is sufficient to evaluate the data of a number of rail vehicles SF1, SF2, SF3 at the same time.

Figure 3:
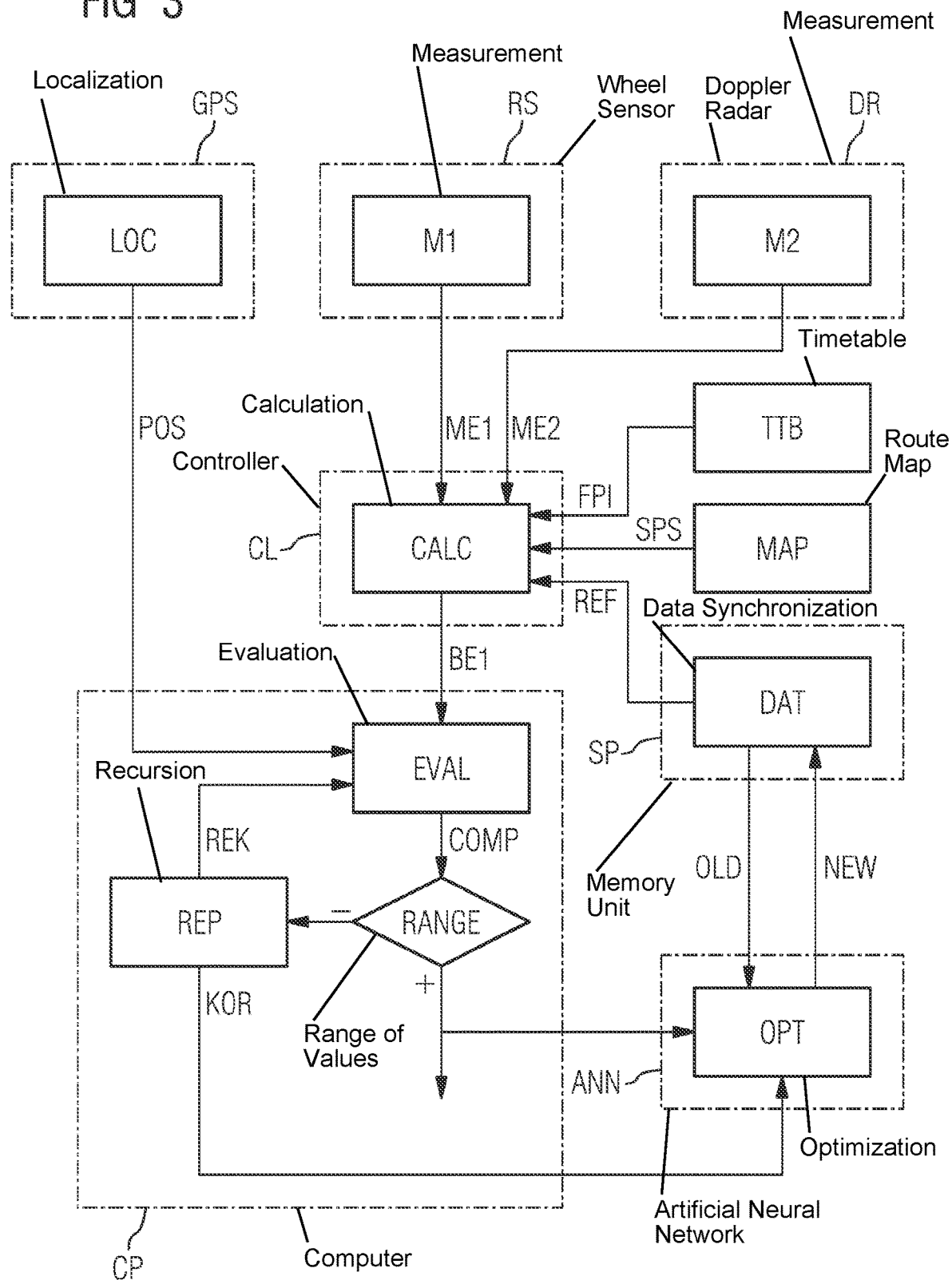
FIG. 3 shows an exemplary embodiment of the inventive odometric method, depicted as a flow diagram.

In FIG. 3 an exemplary embodiment of the inventive odometric method can be understood. For improved clarity the system boundaries of the individual functional elements in accordance with FIG. 1 and FIG. 2, such as e.g. the Doppler radar DR, the wheel sensor RS, the controller CL, the computer CP and the artificial neural network ANN are depicted. This makes clear the units in which the individual method steps in accordance with this exemplary embodiment of the odometric method can be carried out.

A first measurement step M1 takes place in the wheel sensor RS and a second measurement M2 takes place in the Doppler radar DR. Both measurement steps M1 and M2 implement the inventive odometric method for example. Said method could also be carried out by just one of the measurement steps M1, M2 being carried out.

In each case the measurement results ME1, ME2 established from the measurement steps M1, M2, consisting of measured values, are forwarded to the controller CL, which carries out a calculation step CALC. The result of the calculation BE1 is forwarded by the controller CL to the computer CP for the purposes of carrying out an evaluation step EVAL.

In the evaluation step EVAL, as well as the evaluation result BE1, further data is included. From a localization step LOC of the global positioning sensor GPS a position signal POS is created and taken into account in the evaluation step EVAL. Moreover in relation to the train or the rail vehicle SF by which the measurement steps M1, M2 have been carried out, timetable information FPI from a timetable TTB is taken into account. Lastly a required position SPS can be established from a route map MAP.

In the evaluation step EVAL these data are synchronized with each other in such a way that in a comparison step COMP it can be decided whether the values of the calculation result BE1 can be used for the further method. If this is the case (+), the odometric method for this measurement step can be concluded. The data is sent to the artificial neural network ANN, which enters this as "new data" NEW into the database of the memory unit SP, where it can be stored as permitted reference data and retrieved in the future as "old data" OLD.

For this purpose a data synchronization DAT is also carried out, by the data relevant for the measurement being read out as reference data REF from the memory unit SP by the computer CP.

Should there be a departure (−) from a range of values RANGE then a recursion step REK is necessary in the method. In accordance with this, on the one hand recursion data REK is used for a repetition of the evaluation step EVAL in the computer CP, in order to establish replacement location information from the replacement data, e.g. the position POS of the global positioning sensor GPS. Moreover correction data KOR is sent to the artificial neural network ANN and leads there to an optimization step OPT, which is carried out automatically by machine learning. Here the data from the recursion step REP and the second evaluation step EVAL can have an influence, since these lead, in a second evaluation of the comparison data COMP, to the range of values being adhered to (+). The artificial neural network ANN decides autonomously when running through the optimization step OPT whether new data NEW is to be written into the memory unit SP and whether old data retrieved from the memory unit SP for the optimization step OPT is to be deleted in order to further optimize the execution of the method.

LIST OF REFERENCE CHARACTERS

SF, SF1, . . . Rail vehicle
GL Track
SN Rail network
RS Wheel sensor
RD Wheel
DR Doppler radar
S1, S2, . . . Interface
CL Controller
CP Computer/processor
GPS Global positioning sensor
ANN Artificial Neural Network
SP Memory unit
RE Processing unit
LZ Control center
AT Antenna
SA1, SA2, . . . Track section
M1, M2 Measurement step
ME1, ME2 Measurement result
CALC Calculation step
BE1 Calculation result
EVAL Evaluation step
LOC Localization step
POS Position signal
TTB Timetable
FPI Timetable information
MAP Route map
SPS Required position
COMP Comparison step
NEW New data
DAT Data synchronization
RANGE Range of values
REP Recursion step
REK Recursion data
KOR Correction data
OPT Optimization step
OLD Old data

The invention claimed is:

1. A method for odometric monitoring of a rail vehicle, the method comprising:
using a sensor in the rail vehicle to record measured values;
calculating at least one of location information or speed information from the measured values;
storing at least one of the measured values or the location information or the speed information;
creating patterns for at least one of the measured values or the location information or the speed information by evaluation of at least one of the measured values or the location information or the speed information already acquired;

when at least one of the location information or the speed information have to be derived exclusively from the measured values of the odometry method, synchronizing at least one of the measured values or the location information or the speed information currently acquired with at least one of the patterns; and using an interface to output an occurrence of deviations of the current acquired measured values from the patterns.

2. The method according to claim 1, which further comprises carrying out the evaluation by machine learning.

3. The method according to claim 2, which further comprises carrying out the machine learning with an artificial neural network.

4. The method according to claim 3, which further comprises providing the artificial neural network as an LSTM network, and supplying the LSTM network continuously or at regular intervals with at least one of the measured values or the location information or the speed information.

5. The method according to claim 1, which further comprises including permitted ranges of values for at least one of the measured values or the location information or the speed information in each of the patterns.

6. The method according to claim 1, which further comprises during the creation of the patterns, linking the locations in which the measured values arise to the patterns as location information.

7. The method according to claim 1, which further comprises during the creation of the patterns, linking additional information relating to at least one of the rail vehicle in which the measured values arose or the measurement method used or the sensor type used, to the patterns.

8. The method according to claim 1, which further comprises using a computer in a rail vehicle to carry out the method.

9. The method according to claim 1, which further comprises using a computer in a control center for rail traffic to carry out the method.

10. A rail vehicle, comprising the computer in the rail vehicle configured to carry out the method according to claim 8.

11. A control center, comprising the computer in the control center configured to carry out the method according to claim 9.

12. A non-transitory computer program product, comprising program instructions stored thereon that when executed on a computer perform the steps according to claim 1.

13. A provision apparatus for the non-transitory computer program product according to claim 12, the provision apparatus at least one of storing or providing the non-transitory computer program product.

* * * * *